United States Patent [11] 3,568,078

United States Patent

[11] 3,568,078

[72] Inventor Guy Majella Pelchat
Indialantic, Fla.
[21] Appl. No. 785,934
[22] Filed Dec. 23, 1968
[45] Patented Mar. 2, 1971
[73] Assignee Radiation Incorporation
Melbourne, Fla.

[54] FM DEMODULATORS WITH SIGNAL ERROR REMOVAL
6 Claims, 7 Drawing Figs.

[52] U.S. Cl. 329/110, 329/112
[51] Int. Cl. H03d 3/00
[50] Field of Search 325/473, 444, 475; 329/110, 112, 136, 146

[56] References Cited
UNITED STATES PATENTS

| | | | |
|---|---|---|---|
| 3,213,450 | 10/1965 | Goor | 325/474X |
| 3,217,262 | 11/1965 | Battail et al. | 329/110 |
| 3,324,400 | 6/1967 | Battail et al. | 329/110 |

*Primary Examiner*—Roy Lake
*Assistant Examiner*—Lawrence J. Dahl
*Attorney*—Donald R. Greene ABSTRACT: An FM demodulator system for improved reception of FM signals at low input signal-to-noise ratios by estimation of the error in the demodulated signal and subtraction of this estimated error from the demodulator output to provide a stronger output.

INVENTOR
GUY M. PELCHAT

BY Hurvitz, Rose & Greene
ATTORNEYS

INVENTOR
GUY M. PELCHAT

BY Hurvitz, Rose & Greene
ATTORNEYS

INVENTOR
GUY M. PELCHAT

BY [signature]

ATTORNEYS

FM DEMODULATORS WITH SIGNAL ERROR REMOVAL

BACKGROUND OF THE INVENTION

The present invention relates generally to demodulators for use in reception of angle-modulated signals, and more particularly to demodulators which are implemented to remove the error from the received signal after demodulation by estimation of that error and subtraction from the normally demodulated signal.

In the past, it has been common, in efforts to improve the reception threshold or lowest acceptable signal to noise ratio in FM signal reception, to employ a frequency demodulator network which the received FM signal is modulated by the output of a local oscillator controlled by a correction factor. The correction factor is developed from the original signal to produce the desired improvement. Such a prior art circuit is shown in FIG. 1. Referring to that FIG., the incoming FM signal is applied to mixer 10 which is also supplied with the output signal of a local oscillator 17. The output signal of the mixer 10 is fed to a narrow band band-pass filter 12, and the filter output is coupled to an FM demodulator 13 which supplies a demodulated output signal to correction network 16. Correction network 16 provides the desired corrected output signal and as well supplies the corrected output to control the output signal of local oscillator 17. A significant problem arises in the fact that the estimated signal emanating from local oscillator 17, to be supplied to mixer 10 to improve the threshold of the receiver, is derived from the demodulated signal itself, the latter being somewhat removed in time from the incoming FM signal applied to mixer 10. In other words, there is a difference in time between the demodulated signal from which the estimated signal is derived and the incoming FM signal with which the estimated signal is to be mixed. Absent certain complex modification features in the correction network, then, the time difference between the signals and the attendant varying characteristics of the signals involved can operate to produce a more undesirable effect than that which might be attributed to the high threshold of the receiver itself.

In a more recently proposed demodulator network, the need for a predictor network or correction network of the type required in the feedback network arrangement described immediately above is obviated by removal of the feedback arrangement itself. That is, the incoming signal need not be processed and then returned or fed back to an earlier section of the network, and therefore the problems of signal time differentials are overcome. More particularly, according to this more recent proposal of a low threshold FM demodulator network, the signal to be demodulated is processed to provide an approximate signal or estimated signal by which to eventually provide the desirable low signal-to-noise ratio reception capability within the receiver. The estimating network precedes the main portion of the demodulating circuit and is arranged to receive the incoming signal with associated noise and to subject the overall signal to a short term spectral analysis. A block diagram of this prior art demodulator is shown in FIG. 2 of the drawings, to which reference is now made for a more complete explanation of that network.

The incoming FM signal is applied to a frequency estimation network 30 which includes in serial connection, a spectrum analyzer 33, a low-pass filter 34 and an oscillator 35. The spectrum analyzer includes several damped resonant circuits arranged for parallel receipt of the incoming FM signal, these resonant circuits having natural frequencies which are successively offset from one another in the frequency band within which the incoming FM signals may lie. By virtue of the parallel processing, i.e., simultaneous application, of the FM signal and the character of that signal, an output signal is derived from one of the damped resonant circuits, which signal is of greater amplitude than the output signals emanating from the other resonators. The higher amplitude signal depends primarily upon the instantaneous frequency of the FM signal under consideration and is utilized for the control of a DC generator whose output voltage is proportional to the ranking of the particular resonator involved, in terms of the successive offsets within the frequency band. This DC voltage is utilized to provide an estimation of the frequency modulated signal by frequency modulation of a local oscillator thereby.

Thus, with further reference to FIG. 2, showing the prior art circuit, the output voltage from spectrum analyzer 33 of frequency estimation network 30 is smoothed by a low-pass filter network 34 and supplied to control a local oscillator and frequency modulator 35. The estimation signal constituting the output signal of oscillator 35 (and thus of frequency estimation network 30) is applied as one input to a mixer 43 in the signal path of the incoming FM signal. The latter is delayed prior to application to mixer 43 by a network 20 whose delay time is set to correspond to the time required to process the FM signal by frequency estimation network 30. The output signal emanating from mixer 43 is then filtered by a narrow band filter 45 and supplied to an FM demodulator 46 to produce an output the demodulated signal thereby obtained is the difference between the modulating signal. Since the demodulated signal thereby obtained is the difference between the modulating signal itself and its estimated value, it is not precisely proportional to the modulating signal. Accordingly, the earlier estimated modulating signal is again derived by supplying the output of oscillator 35 to filter and delay network 47 and thence to FM demodulator 48, for addition to the signal output of demodulator 46 and adder 49. The resultant output signal is then the corrected modulating signal.

According to a still more recently proposed low-level frequency modulated signal demodulator, an improvement of the immediately previously described demodulator is designed to provide a coherent estimate of the modulating signal by a stricter consideration of the phase relationships the various voltages processed and obtained in the estimation network. In particular, the coherent estimation of the modulating signal is said to reduce the random effect which may occur when the output signals developed across two or more of the damped resonators of neighboring resonance frequencies are substantially equal, in which case the controlled DC voltage may shift back and forth between the values determined by the ranking of those resonators. To remove this undesired effect, the exercise of control is made dependent upon not only the magnitude of the high-frequency output signal of each resonator relative to the output signals of the other resonators, but upon the relative phase of these output signals with respect to a reference signal hose frequency is selected in accordance with the previously determined value of the instantaneous frequency of the received signal.

The major disadvantage of the last two mentioned prior art FM demodulators resides in THE complexity of the circuitry required to produce the estimated signals, and the further fact that even after an estimated signal has been obtained it is necessary to produce a further estimated signal which must also be employed to obtain the final desired output signal. It is, accordingly, a principal object of the present invention to provide a vastly simplified FM demodulator network with improved reception threshold capabilities.

SUMMARY OF THE INVENTION

Briefly, according to the present invention, the incoming FM signal is demodulated to provide the desired signal plus any error that may be associated therewith, and an estimate of the error is then derived. The estimated error may then be introduced into the desired signal with the actual error waveform thereon, in such a manner as to cancel or substantially reduce the magnitude of this actual error waveform. The resultant signal constitutes the improved output signal. I have found that a gain in performance may be achieved at input signal strengths at which the initial demodulator is in its threshold region. That is, significantly improved reception is obtained even at those signal strengths in which a conventional FM demodulator is in its threshold region, by the addition of only a few very simple conventional components to that demodulator. In accordance with an embodiment of the present invention, the incoming FM signal is applied to the standard FM demodulator and, in parallel, to a delay line. The output of the demodulator is itself utilized to modulate a further signal and the modulated output signal applied to a mixer whose other input signal is that emanating from the delay line. Accordingly, the output of the mixer is an FM carrier modulated with the error waveform appearing on the originally demodulated signal and with some added noise as a result of the signal processing. This output signal of the mixer is then modulated to provide an estimate of the error obtained in the first demodulation, with some added time delay. The latter demodulation process results in the introduction of some error in the estimated error waveform, but the introduced error is of much smaller magnitude than the original error waveform. After delay equalization of the initially demodulated signal plus error, the estimated error waveform is subtracted therefrom to produce an improved output signal. It is therefore another broad object of the present invention of provide an improved FM demodulator with reduced threshold of reception, in which the error on the demodulated signal is estimated and employed to cancel the actual error.

BRIEF DESCRIPTION OF THE DRAWINGS

The above and still further objects, features and attendant advantages of the present invention will become apparent from a consideration of the following detailed description of a preferred embodiment and certain modifications thereof, especially when taken in conjunction with the accompanying drawings, in which.

DESCRIPTION OF THE PREFERRED EMBODIMENT

The basic improved FM demodulator of the present invention includes means for demodulating the incoming FM signal, means responsive to the demodulated signal and any error waveform thereon for frequency modulating a carrier therewith, means responsive to the frequency-modulated carrier and to a delayed replica of the incoming FM signal for mixing thereof to produce an FM carrier modulated with the error waveform, means for demodulating the FM carrier modulated with the error waveform to produce an estimate of the error waveform, means for providing delay equalization of the initially demodulated signal and error waveform thereon relative to the estimated waveform, and means for combining the estimated error waveform with the delay equalized demodulated signal and actual error waveform to produce a demodulated signal substantially free of error.

Figure 1:
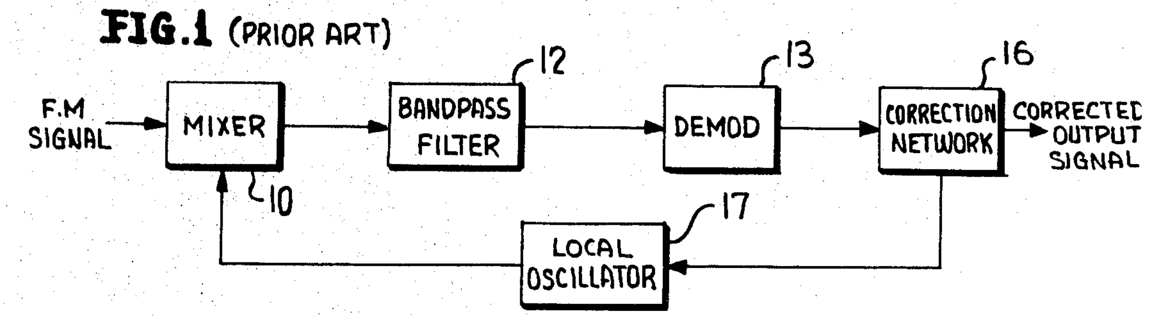
FIG. 1 (PRIOR ART)
FIG. 1 is a block diagram of a previously described prior art FM demodulator network suitable for somewhat improved reception at low input signal-to-noise ratios.
Figure 2:
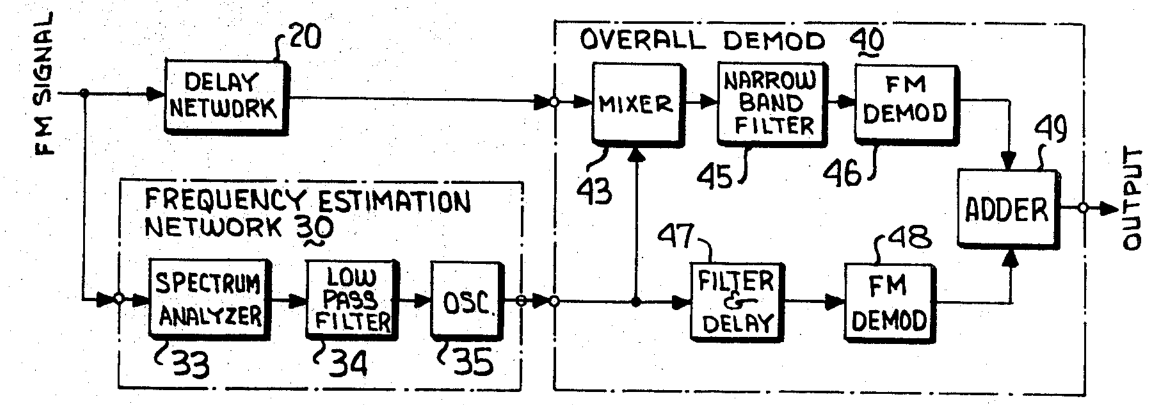
FIG. 2 (PRIOR ART)
FIG. 2 is a block diagram of another previously described prior art FM demodulator network in which estimation of the modulating signal and of the FM signal to be demodulated is required.
Figure 3:
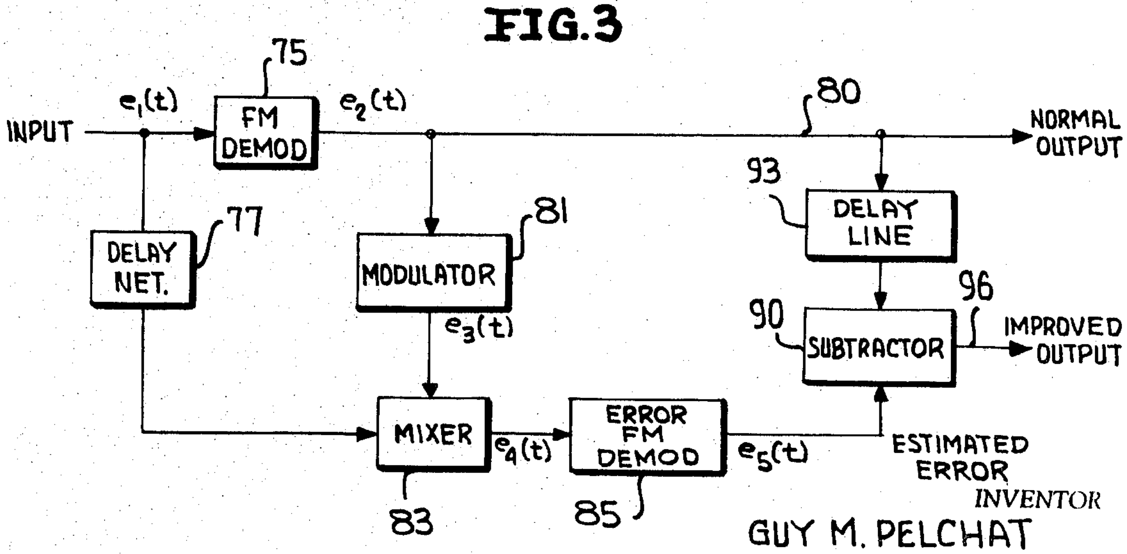
FIG. 3 is a block diagram of a preferred embodiment of the present invention.

In the preferred embodiment shown in FIG. 3, the circuit conforming to this generalized network includes an FM demodulator 75 to which the input or incoming FM signal *ed* 1$(t)$ is applied, and which develops a demodulated output signal $e_2$ $(t)$ in response to the input signal. The incoming FM signal is also applied in parallel to a delay network 77. The output signal $e_2$ $(t)$ of FM demodulator 75 is applied in parallel to a modulator 81 and, via a signal path or line 80, to another delay network or delay line 93. The output signal of modulator 81, designated $e_3(t)$, is applied to a conventional mixer 83 which receives its second input signal, with which signal $e_3(t)$ is to be mixed, the delayed replica of incoming FM signal $e_1$ $(t)$. The output signal of the mixer, designated $e_4(t)$, is applied to another FM demodulator 85, whose output $e_5(t)$ is fed to a subtraction network 90. The other input signal to the subtraction network is the delayed replica of demodulated signal $e_2(t)$, following passage through delay line 93. The output signal of the subtractor, taken from line 96, constitutes the improved demodulated output signal, that is, the desired information signal substantially free of any error.

Operation of the network of FIG. 3 may best be explained by reference to mathematical descriptions of the waveforms, neglecting constant phase shifts and other waveform characteristics which are not pertinent to the basic operation. The incoming signal $e_1(t)$ may be represented as $$e_1(t) + cos[w_c t + (t)] = n_1(t) \qquad (1)$$

where the signal to be detected, i.e., the desired modulated signal, is $cos[w_c t + \ (t)]$ and the accompanying noise is $n_1(t)$.

In the signal of interest, $(t)$ is the modulating signal, and $w_c$ is the carrier (angular) frequency. Following processing by FM demodulator 75, we obtain $$e_2(t) = \ (t - T_1) + \epsilon_1(t) \qquad (2)$$

where $(t - T_1)$ is the original modulation signal constituting the information sought, into which some delay time $T_1$ has been introduced during processing, and $\epsilon_1(t)$ is an error waveform including deviations attributable to noise and other degrading phenomena.

The signal $e_2(t)$ is utilized to modulate a carrier $w_1 t$ in modulator 81 to produce $$e_3(t) = cos[w_1 t + \ (t - T_1) + \epsilon_1(t)]. \qquad (3)$$

Upon mixing of *ed* $3(t)$ with the output signal $e_1(t - T_1)$ of delay network 77 (which is set to introduce a time delay of $T_1$ seconds) in mixer 83, there is obtained $$e_4(t) = cos[w2t + \epsilon_1(t)] + n_2(t) \qquad (4)$$

in which $w_2 t$ is a combination of $w_1 t$ and $w_c(t - T_1)$, $n_2(t)$ is the noise added to this new FM carrier, part of that noise appearing on the original input signal $e_1(t)$, and the desired modulating signal $(t)$ with time delay thereon has vanished as a result of equal amounts of this component in the two input signals to mixer 83. In other words, the output of the mixer is an FM carrier modulated with some error $\epsilon_1$, and the added noise is $n_2(t)$.

Waveform $e_4(t)$ is used to drive a second FM demodulator 85, which, like demodulator 75 may be of any conventional design, such as a Foster-Seely discriminator, a phase-lock loop, or a frequency feedback demodulator. The demodulated output of demodulator 85 is therefore $$e_5(t) = \epsilon_1(t - T_2) + \epsilon_2(t) \qquad (5)$$

where $\epsilon_1(t)$ is the error to be removed from signal $e_2(t)$ and has some time delay $T_2$ thereon, and $\epsilon_2(t)$ is the error of much smaller magnitude introduced as a result of noise input and processing in demodulator 85.

Delay line 93 is arranged to introduce a time delay of *T2 seconds into signal* $e_2(t)$, and this time delayed replica of $e_2(t)$ is combined with $e_5(t)$ in subtractor 90. The resulting output signal on line 96 is therefore $$e_6(t) = \ (t - T_1 - T_2) + \epsilon_2(t). \qquad (6)$$

As previously observed, the second error waveform $\epsilon_2(t)$ is of much smaller magnitude than $\epsilon_1(t)$, and hence, the output signal $e_6(t)$ is effectively the desired modulation signal with some time delay thereon.

It will be noted that the above mathematical expressions of the waveforms are presented in terms of phase modulation, whereas the specific apparatus within the network is referred to in terms of frequency modulation. Obviously, the present invention may be used in signal reception involving any form of angle modulation, it being noted that phase modulation and frequency modulation methods are directly related by the fact that the instantaneous frequency of the carrier is also the time derivative of the instantaneous phase of the carrier.

Figure 4:
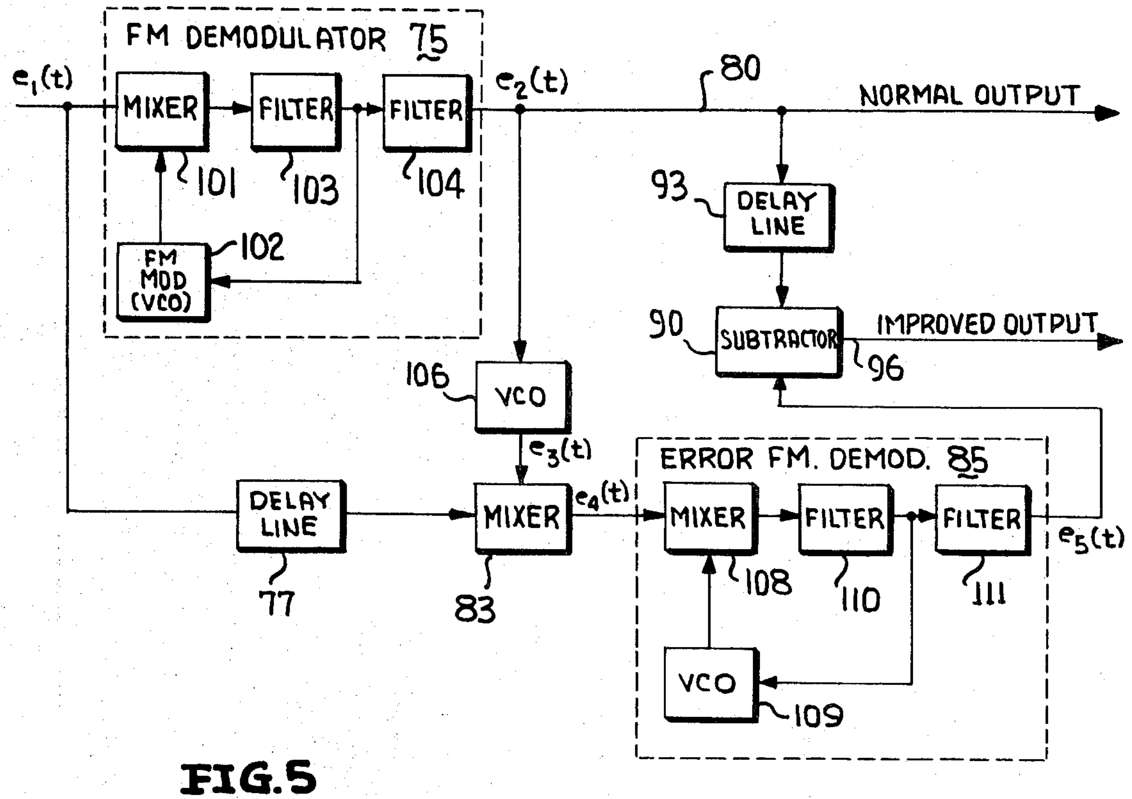
FIGS. 4 through 7 are block diagrams of modifications of the network of FIG. 3 for use with specific FM demodulators or in specific signal applications.

Referring now to FIG. 4, an implementation of the preferred embodiment utilizing phase-lock loops as Fm demodulators 75 and 85 is further provided with a voltage controlled oscillator (VCO) 106 as the modulator 81 of FIG. 3. In the circuit of FIG. 4, the incoming FM signal $e_1(t)$ is applied to mixer 101 of the phase-lock loop along with the FM output signal of a VCO 102 within the loop. The output signal of VCO 102 t) the filtered demodulated signal obtained from filter 103 coupled to receive the output signal from mixer 101. Accordingly, the mixer removes the modulating signal from the FM carrier and the demodulated output is filtered by filters 103 and 104 to produce output signal $e_2(t)$. VCO 102 is phase locked to the demodulated signal. As described with reference to FIG. 3, output signal $e_2(t)$ is applied to a modulator, here VCO 106, to produce an FM carrier with the error signal associated with demodulated signal $e_2(t)$ modulated on the carrier. The FM carrier constitutes one of the input signals, along with the delayed version of input FM signal $e_1(t)$ from delay line 77, to mixer 83. The output signal of mixer 83, which is now simply the FM carrier modulated with the error waveform, is applied to error FM demodulator 85, constituting a second phase-lock loop including mixer 108, VCO 109 and filter 110. Operation of the phase-lock loop (PLL) demodulator 85 is precisely the same as that of PLL demodulator 75 except, of course, for the specific signals involved. The output signal of demodulator 85, $e_5(t)$, is then applied to the subtractor 90 along with the initially demodulated signal with undesirable error waveform thereon, appropriately delayed by delay line 93. Again, the improved output is taken on line 96, constituting the output path of subtractor 90.

Tests of the phase lock loop version of the invention have shown that the threshold is lowered by two desibels or more, relative to the threshold of a conventional well-designed phase-lock loop, i.e., that depicted as the normal output in FIG. 4.

Figure 5:
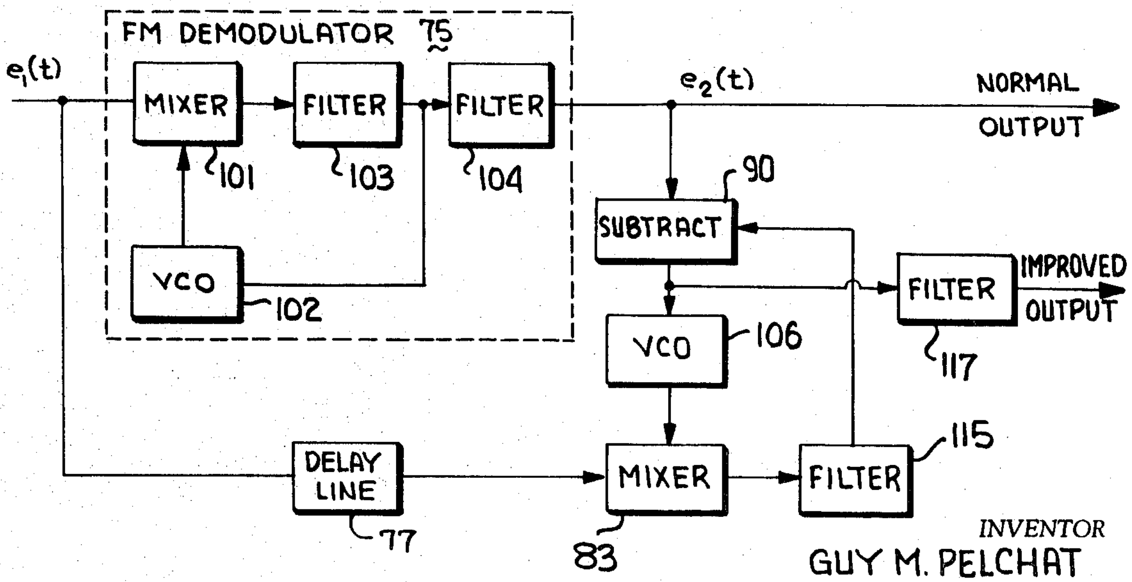

The network of FIG. 4 may be simplified to some extent to decrease the number of components without changing the operation of the system, in the manner shown in FIG. 5. Referring to FIG. 5, the FM demodulator 75 again includes a phase-lock loop comprising mixer 101, VCO 102, and filter 103, and a further filter 104. The phase-lock loop of error FM demodulator 85, however, is arranged to include some of the components of the circuit of FIG. 4 (or FIG. 3) which were present in those embodiments in addition to the normal components of the phase-lock loop. In particular, the phase-lock of demodulator 85 includes mixer 83, VCO 106, and filter 115, with the filter supplying one input to subtractor 90 and the output signal of the subtractor controlling the modulated output of VCO 106. The output of the subtractor is also supplied to filter 117 this filtered output constitutes the improved demodulated output signal. Operation of the circuit of FIG. 5 is substantially the same as that described above with respect to FIG. 4.

Still another modification of the present invention, at least in terms of the preferred embodiment shown in FIG. 3, involves the use of frequency feedback demodulators as FM a demodulators 75 and 85.

Figure 6:
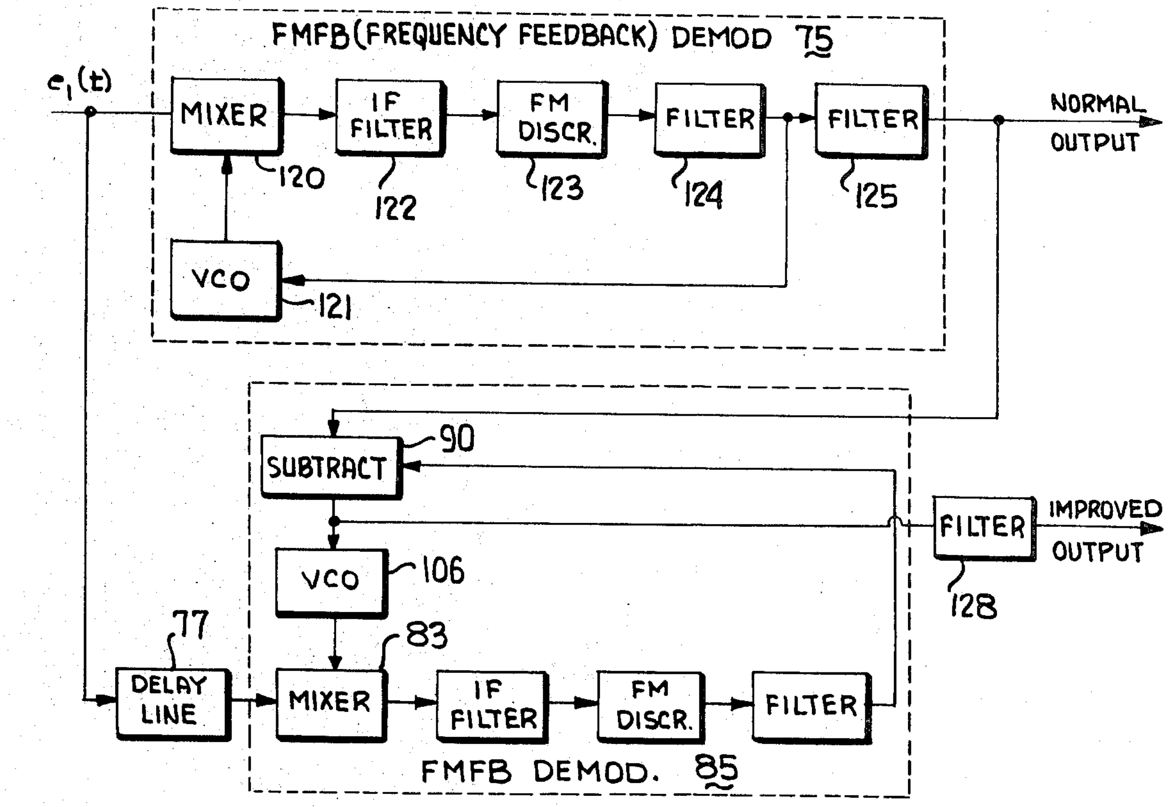

The error FM demodulator 85 of FIG. 6 comprises an FM frequency feedback (FMFB) demodulator which utilizes subtractor 90, VCO 106, and mixer 83 as a portion of its circuitry. The frequency feedback modulators are wholly conventional and, accordingly, neither a description of their specific operation nor a further discussion of the overall operation of the network is deemed necessary. It is sufficient to note that FMFB demodulator 75, for example, includes mixer 120, VCO 121, IF filter 122, FM discriminator 123, and filters 124 and 125, with control of the VCO taken from the output of filter 24. The substantially error-free demodulated signal of overall network is taken from a filter 128 to which is applied the output signal of subtractor 90 of FMFB demodulator 85.

Figure 7:
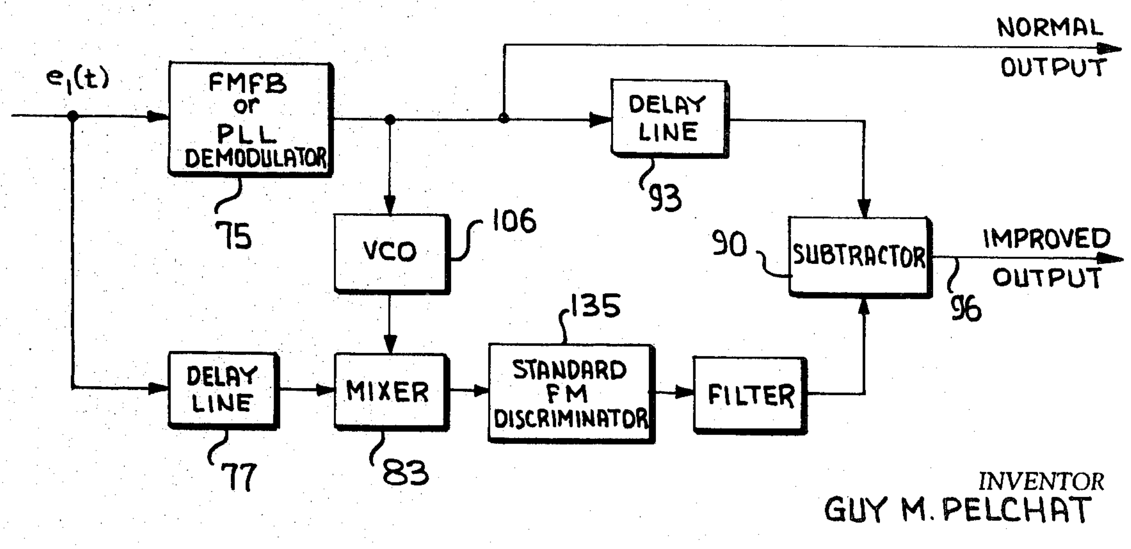

Referring now to FIG. 7 a network is shown which takes advantage of the fact that standard FM discriminators provide approximately the same results as either the phase-lock loop or the frequency feedback demodulators for small modulation index, and that the error waveform of interest will generally constitute a small modulation index. Accordingly, as shown in the circuit of FIG. 7, FM demodulator 75 constitutes either a frequency feedback demodulator or a phase-lock loop demodulator, as may be desired to provide the initial demodulated signal, while the error FM demodulator constitutes a standard FM discriminator 135 since it is merely required to remove the error signal from the FM carrier with which it is modulated.

From the foregoing specification, it will be observed that the present invention permits the reception of FM signals at much lower input signal-to-noise ratios than can be achieved with conventional FM demodulators, and yet performs in this manner by a very simple modification of the conventional FM demodulator. In addition, the present invention is effective to reduce distortion of the FM signal in the absence of noise.

I claim:

1. A demodulator network for frequency modulated signals, said network comprising means for demodulating an incoming frequency-modulated signal, means responsive to the demodulated signal and any error waveform thereon for frequency modulation thereof to generate a second frequency-modulated signal consisting of a carrier frequency modulated by said demodulated signal and error waveform, means responsive to said second frequency-modulated signal and to a delay equalized version of said incoming frequency-modulated signal for mixing thereof to cancel said demodulated signal and thereby to produce a third frequency-modulated signal in which the carrier is frequency modulated substantially only by said error waveform, means for demodulating said third frequency modulated signal to extract said error waveform an estimate of the error in the original demodulated signal, and means for subtractively combining the extracted error waveform with a delay-equalized version of the original demodulated signal and the actual error waveform associated therewith to produce a substantially error-free demodulated output signal.

2. The invention according to claim 1 wherein the last-named demodulating means is an FM discriminator.

3. The invention according to claim 1 wherein said means for combining is included in the last-named means for demodulating.

4. An FM demodulator network comprising
means for demodulating an incoming FM signal;
means responsive to the demodulated signal and any error waveform associated therewith and to the original incoming FM signal, delay equalized with the demodulated signal, to generate a carrier frequency modulated by said error waveform;
means for demodulating said modulated carrier frequency to obtain an estimate of said error waveform; and
means for applying said estimated error waveform to a correspondingly timed replica of the initially demodulated signal with actual error waveform to substantially cancel said actual error waveform thereby lower the reception threshold of said network.

5. The invention according to claim 4 wherein said means for applying is included in the last-named means for demodulating.

6. A demodulator network for angle modulated signal, comprising:
means for demodulating said signal;
means responsive to the demodulated signal and any error waveform associated therewith and to the original incoming signal, delay equalized with the demodulated signal, to produce a carrier signal modulated by said error waveform;
means for detecting said error waveform from said carrier signal as an estimate of the actual error waveform; and
means for subtracting the estimated error from a delay-equalized replica of said demodulated signal with its actual error waveform, to substantially remove the actual error waveform from the demodulated signal.

UNITED STATES PATENT OFFICE

CERTIFICATE OF CORRECTION

Patent No. 3,568,078 Dated March 2, 1971

Inventor(s) Guy Majella Pelchat

It is certified that error appears in the above-identified pate and that said Letters Patent are hereby corrected as shown below:

On the "Abstract" page, under "assignee", "Radiation Incorpo should read -- Radiation Incorporated --. Column 2, lines 20 and 21, "the demodulated signal thereby obtained is the difference between the modulating"; line 48, "hose" should read -- whose --; line 52, "THE' read -- the --. Column 3, lines 66 and 67, "ed 1(t)" should read --$e_1$ Column 4, line 15, the equation should read -- $e_1(t) = \cos[\omega_c t + \phi(t)] + n_1(t)$ --; line 18, "$\cos[\omega_c t + (t)]$" should r -- $\cos[\omega_c t + \phi(t)]$ --; line 19, "(t)" should read -- $\phi(t)$ --; line 22, the should read -- $e_2(t) = \phi(t-T_1) + \epsilon_1(t)$ --; line 24, "$(t-T_1)$" should read -- $\phi(t-T_1)$ --; line 32, the equation should read -- $e_3(t) = \cos[\omega_1 t + \phi(t-T_1) + \epsilon_1(t)]$ --; line 34, "ed 3(t)" should read -- $e_3(t)$ --; line 38, the equation should read -- $e_4(t) = \cos[\omega_2 t + \epsilon_1(t)] + n_2(t)$ --; line 43, "(t)" should read -- $\phi(t)$ line 59, "T2" should read -- $T_2$ --; line 60, "seconds into signal" sho be italicized; line 64, the equation should read -- $e_6(t) = \phi(t-T_1-T_2) + \epsilon_2(t)$ --. Column 5, line 5, "Fm" should read line 11, "t)" should read -- is controlled by --; line 36, "desibels" sh read -- decibels --; line 50, after "phase-lock" (second occurrence) i -- loop --; line 55, after "117" insert -- and --; line 61, after "FM" c "a"; line 66, "modulators" should read -- demodulators --; line 73, a "of" insert -- the --. Column 6, line 35, after "waveform" insert -- a Signed and sealed this 31st day of August 1971.

(SEAL)

Attest:

EDWARD M. FLETCHER, JR.
Attesting Officer

WILLIAM E. SCHUYLER, JR
Commissioner of Patents

FORM PO-1050 (10-69)